(12) United States Patent
Salour et al.

(10) Patent No.: US 7,629,887 B2
(45) Date of Patent: Dec. 8, 2009

(54) METHOD AND APPARATUS FOR OPTIMIZED WORK FLOW MONITORING

(75) Inventors: Ali Salour, Fenton, MO (US); Douglas D. Trimble, St. Peters, MO (US)

(73) Assignee: The Boeing Company, Chicago, IL (US)

( * ) Notice: Subject to any disclaimer, the term of this patent is extended or adjusted under 35 U.S.C. 154(b) by 354 days.

(21) Appl. No.: 11/643,215

(22) Filed: Dec. 21, 2006

(65) Prior Publication Data
US 2008/0154415 A1    Jun. 26, 2008

(51) Int. Cl.
*G08B 13/14* (2006.01)
(52) U.S. Cl. ............... 340/572.1; 340/568.1; 340/686.6
(58) Field of Classification Search ... 340/572.1–572.9, 340/568.1, 686.1, 686.6; 455/422.1, 456.1
See application file for complete search history.

(56) References Cited

U.S. PATENT DOCUMENTS

| | | | |
|---|---|---|---|
| 5,528,232 A * | 6/1996 | Verma et al. | 340/825.49 |
| 5,920,261 A * | 7/1999 | Hughes et al. | 340/568.8 |
| 6,121,926 A * | 9/2000 | Belcher et al. | 342/450 |
| 6,219,613 B1 * | 4/2001 | Terrier et al. | 701/207 |
| 6,380,894 B1 * | 4/2002 | Boyd et al. | 342/450 |
| 6,812,824 B1 * | 11/2004 | Goldinger et al. | 340/10.1 |
| 2004/0049428 A1* | 3/2004 | Soehnlen et al. | 705/25 |
| 2005/0078006 A1* | 4/2005 | Hutchins et al. | 340/561 |

* cited by examiner

*Primary Examiner*—Daniel Previl
(74) *Attorney, Agent, or Firm*—Gates & Cooper LLP

(57) ABSTRACT

A method and apparatus for monitoring work flow of a resource is disclosed. The method accounts for the expected work flow of the resource in determining the location of the resource as well as dwell times at each work zone. In one embodiment, this is accomplished by determining if subsequent work zones sequentially follows the first work zone in the expected sequence of work zones.

12 Claims, 5 Drawing Sheets

METHOD AND APPARATUS FOR OPTIMIZED WORK FLOW MONITORING

BACKGROUND OF THE INVENTION

1. Technical Field

The present disclosure relates to systems and methods for monitoring the work flow of a resource.

2. Description of the Related Art

Manufacturing costs represent a large portion of the cost to assemble products for eventual sale. However, such manufacturing costs can be greatly reduced by proper work flow management.

Work flow management, however, typically requires monitoring of the work process itself. Such data not only provides statistical data regarding the assembly process itself (data that can be used to formulate new work flows and processes), it can also provide data that can be used in the assembly process itself. For example, if its known that an assembly has just passed a particular assembly station, that information can be used to begin a process that must be completed before the assembly proceeds to a subsequent assembly station.

The location of assemblies and parts can be determined using commercially available wireless identification system such as radio frequency identification (RFID) systems. Radio Frequency Identification (RFID) is an automatic identification method that stores and remotely retrieves data using devices called RFID tags or transponders. An RFID tag can be attached to or incorporated into the assembly or part, and can be used to identify the subject using radio waves. Chip-based RFID tags contain silicon chips and antennas. Tags include passive tags, which require no internal power supply, and active tags, which require a power source.

Active tags work relatively well when they are within the line of sight of three or more location receivers. Problems occur when an active tag is surrounded by metal objects and the radio transmissions travel through indirect paths before they are received. Under these conditions, signal reflect against intermediary objects which may serve as primary signals, and/or multiple signal paths (multipaths) distorting the time of arrival to the receivers. This alteration causes inaccuracies in receiving and time stamping the signals used in the calculation of the location coordinates.

Commercially available active radio identification systems provide location signals for triangulation ranging between 5 feet to 100 feet from the true location. This level of accuracy is acceptable in the environments where approximation is possible and not critical to a decision process.

However, in many manufacturing facilities, the accuracy provided by commercially available RFID system may be insufficient due to the close proximity of location boundaries. When the accuracy problem exceeds the assigned location boundary (i.e. aircraft position, work cell, stock room, etc), the reported location is constrained and inaccurate. This not only affects the system's ability to determine which area the assembly is located, it also affects the gathering of statistics regarding how long the assembly remained in that area. That is because any data regarding how long an assembly was in any particular work cell is typically reset when the assembly leaves the cell.

The foregoing problems may be ameliorated by increasing the accuracy of the RFID system, but in the multipath environment described above, this can be prohibitively expensive or impossible What is needed is a system and method that provides sufficiently accurate and reliable information as to the location status of assemblies, yet does so using commercially available RFID systems. The present invention satisfies that need.

SUMMARY

To address the requirements described above, this document discloses a method and apparatus for monitoring work flow of a resource. In one embodiment, the method comprises the steps of defining a work flow describing an expected work path of the resource, in which the work flow comprising a sequence of a plurality of defined work zones, monitoring the location of a wireless tag associated with a defined resource type and attached to a resource being a member of the defined resource type, when the monitored location of the wireless tag moves from a first work zone to a second work zone, determining if the second work zone sequentially follows the first work zone in the sequence of work zones, if the second work zone does not sequentially follow the first work zone in the sequence of work zones, associating the monitored location of the wireless tag with the first zone, and if the second work zone sequentially follows the first work zone, associating the monitored location of the wireless tag with the second zone.

One embodiment of the apparatus comprises a wireless locating system having a plurality of tags, a receiver for receiving signals transmitted by the plurality of tags, a locating system for locating the tags based on the received signals, wherein the locating system comprising a processor having a memory storing instructions comprising instructions for performing steps including the steps of accepting a defined a work flow describing an expected work path of the resource, the work flow comprising a sequence of a plurality of defined work zones, monitoring the location a wireless tag associated with a defined resource type and attached to a resource being a member of the defined resource type; when the monitored location of the wireless tag moves from a first work zone to a second work zone, determining if the second work zone sequentially follows the first work zone in the sequence of work zones, associating the monitored location of the wireless tag with the first zone if the second work zone does not sequentially follow the first work zone in the sequence of work zones, and associating the monitored location of the wireless tag with the second zone if the second work zone sequentially follows the first work zone.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments. It is understood that other embodiments may be utilized and structural changes may be made without departing from the scope of the present disclosure.

Figure 1:
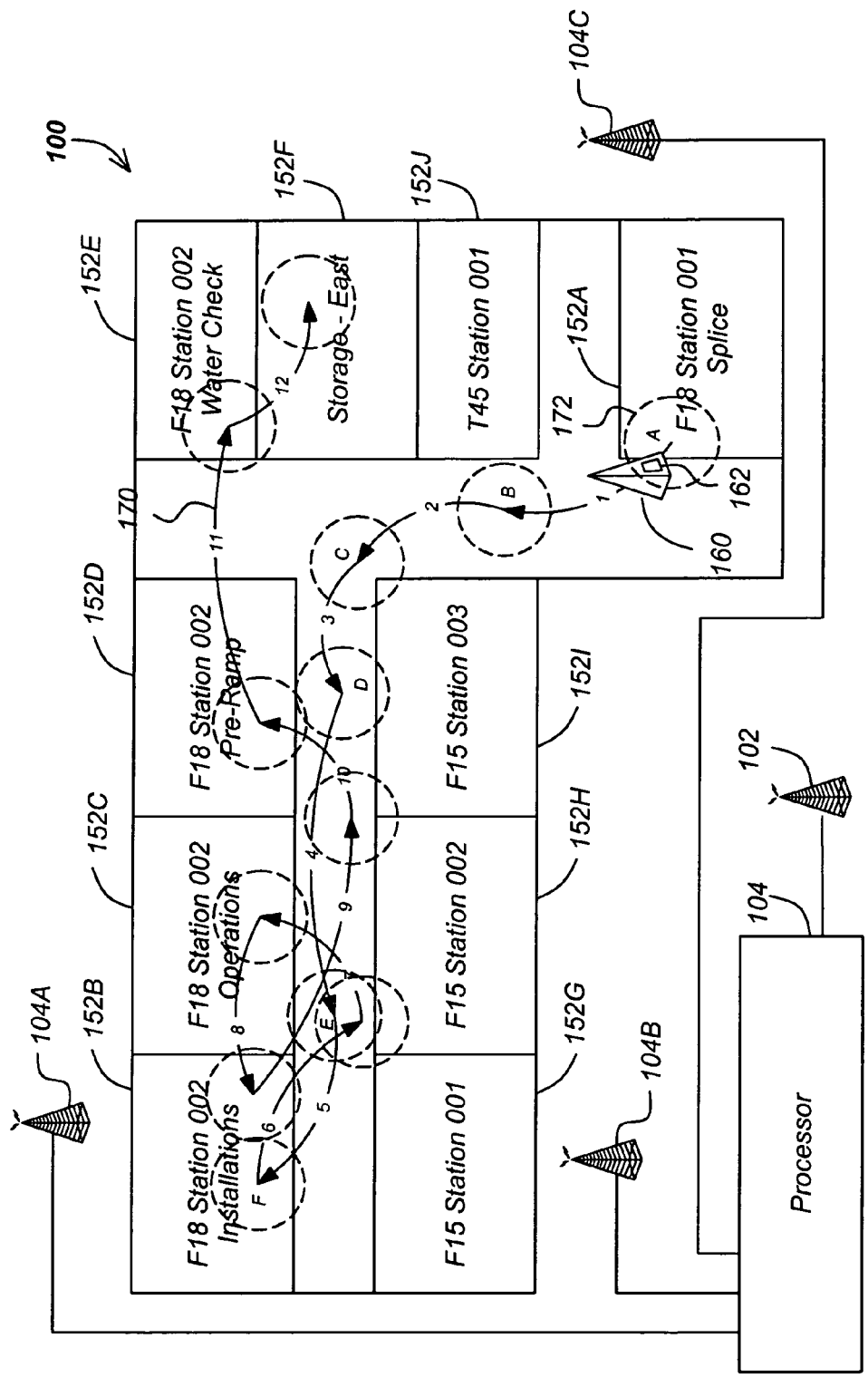
FIG. 1 is an illustration of a wireless locating system such as an RFID system.

FIG. 1 is an illustration of a wireless locating system (WLS) such as an RFID system 100. The RFID system 100 comprises a transmitter 102, and a plurality of receivers 104A-104C, communicatively coupled to a processor 104. The processor 104 controls the transmitter 102 to broadcast a signal that is received by transponders or tags 162 that are attached to a product or resource 160 to be assembled. The tag 162 may be an active tag (self powered) or a passive tag (which is powered by energy received from the transmitter 102). The tag 162 receives the signal, and responds by transmitting a transponding signal that includes information identifying the tag 162. The transponding signal is received by the plurality of receivers 104A-104C, and the received signal is provided to the processor 104. The processor uses the information in the received signals to identify the tag 162 and to determine the location of the tag 162. Typically, this is accomplished by triangulation using the time-of-arrival of the transponded signal to each of the plurality of receivers 104A-104C.

In order that the tag 102 provides information regarding the location of the product 160, a plurality of work zones 152A-152J (hereinafter collectively referred to as work zone(s) 152) are defined. Typically, the work zone(s) 152 are defined by providing inputs defining the boundaries of the work zone(s) 152 to the processor 104, which typically comprises a computer system such as the one further described below.

The product is assembled by passing through a work path 170, which can be defined by a sequence of work zones 152. In the illustrated embodiment, the product 160 is assembled by performing an operation in first work zone 152A, then by performing another operation in second work zone 152B, and the subsequently by performing other operations in work zones 152C, 152B, 152D, 152E, and 152F, in that order.

The location of the product 160 can be determined using the tag 162, and the RFID system 100. This information can be used to implement "just in time" assembly or to collect data regarding how long the product remains in each work zone 152 or group of work zones 152. This information can be used to improve production procedures, to modify the work path 170, or to determine how such modifications might affect time required to assemble the product 160.

Unfortunately, as described above, workspace factors such as multipath distortion can negatively affect the accuracy of commercially available RFID systems 100 to the point that the uncertainty in the location of the tag 162 is sufficient to make it difficult for the RFID system 100 to determine which work zone 152 the product is located. For example, when the tag 162 is disposed at position "A," it is within the first work zone 152A (F18 Station 001, Splice), but the accuracy of the RFID system 100 in determining the position of the tag 162 is such that the measured location of the tag 162 may place it outside of the work zone 152A as shown. As a consequence, the estimate of the time that the product 160 spends in the first work station 152A will be in error. Making matters worse, many commercially available RFID systems 100 reset timers when it believes that the tag 162 has left the work zone 152A, resulting in very large errors in the elapsed time estimates.

In the embodiment illustrated in FIG. 1, the product leaves the first work zone 152A and is temporarily placed in the aisle at location "B." In this location, the RFID location errors are such that the tag 162 is not located to be in any of the other identified work zones 152. However, when the product 160 is later moved to location "C", the accuracy is such that the RFID system 1000 may locate the tag 162 and associated product 160 in work zone 152I instead of the aisle, where the product 160 and tag 162 are actually located. This may cause the RFID system 100 to erroneously begin counting time in work zone 152I, even if the product is never supposed to enter this work zone 152I. Similarly, when the product is disposed at location "E," the RFID system 100 may locate the product 160 and associated tag 162 in work zone 152C, when in fact, the product is still in the aisle. Not until the product and associated tag 162 is moved to location "F" will the RFID system 100 locate the tag 162 in the proper work zone 152B (and even then, just as was the case when the tag 162 was in the first work zone 152A, the accuracy of the RFID system 100 is such that the tag 162 may also be located outside the work zone 152B when it is, in fact, within the work zone 152B. This disclosure presents a description of a system and method that ameliorates the foregoing problems.

Figure 2:
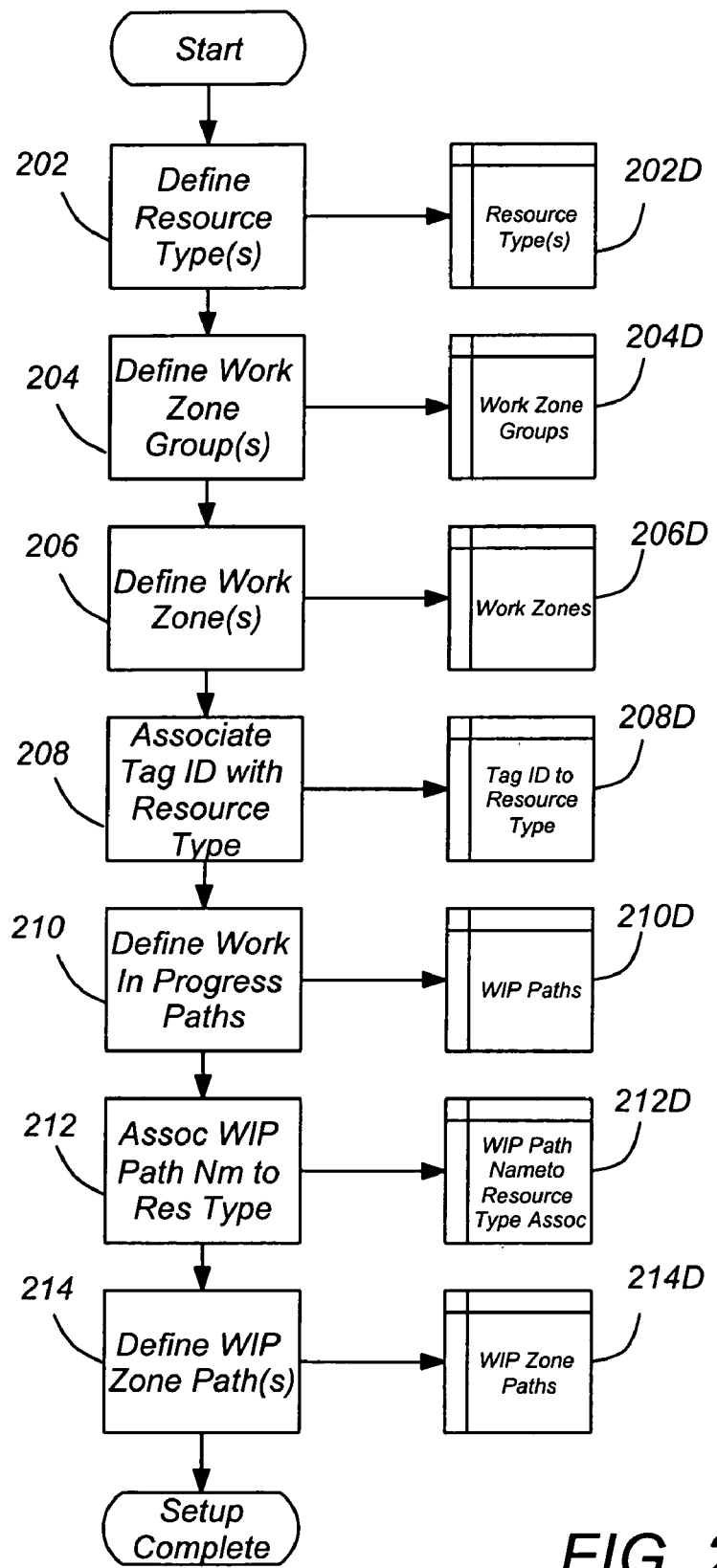
FIG. 2 is a flow chart illustrating exemplary method steps that can be used to set up an improved RFID system.

FIG. 2 is a flow chart illustrating exemplary method steps that can be used to set up an improved RFID system 100. As shown in step 202, resource types are defined, producing resource types 202D. An example of such resource types is shown in Table I below:

TABLE I

| Resource Type (R/T) | Resource |
|---|---|
| 1001 | F18 |
| 1002 | F18 MLG |
| 1003 | F18 NLG |
| 2001 | F18 N/G Tool |

Each resource (for example, an F18 fighter) is a member of its associated resource type. For example, the F18 is a member of resource type 1001. Next, work zone 152 groups can be defined, as shown in step 204. Work zone groups are groups that comprise a plurality of defined work zones. The result is work zone group data 204D. Exemplary work zone groups are shown in Table II below:

TABLE II

| Work Zone Group |
|---|
| B67 Final Assembly |
| B67 F18 Forward Fuselage |
| B67 F18 Inner Wing |
| B67 F18 Outer Wing |
| B101 Tube Shop |

In step 206, work zones 152 are defined. Work zones are boundaried areas where one or more activities related to the assembly of the product 160 take place. They may be defined by specifying the boundaries and giving the work zone 152 a name. Defined work zones 152 are optionally associated with a work group. The result is the work zone data 206D shown in FIG. 2. Exemplary work zone groups are shown in Table III below:

TABLE III

| Work Zone | Work Group |
|---|---|
| F18 Station 001 - Splice | B67 Final Assembly |
| F18 Station 002 - Installations | B67 Final Assembly |
| F18 Station 003 - Operations | B67 Final Assembly |
| F18 Station 004 - Pre-Ramp | B67 Final Assembly |

As described above, each tag 162 is associated with an identifier, and the tags 162 transmit that identifier after they receive a ping from the RFID transmitter 102. In step 208, an the identifier of each tag 162 (which is later placed in or on the resources 160) is associated with a resource type, thus creating data 208D relating the tag ID to the resource type. Exemplary data is shown below in Table IV:

TABLE IV

| Tag ID | Resource Type (R/T) | Resource ID (R/ID) |
|---|---|---|
| 18042793 | F18 | AC-E127 |
| 18035132 | F15 | AC-K13 |
| 18048254 | T45 | AC-A191 |

One or more work paths 170 are defined, as shown in step 210. The result is work path data 210D comprising a list of defined work paths 170. Exemplary data is shown below in Table V:

TABLE V

| |
|---|
| F15 Final Assembly |
| F18 Final Assembly |
| F18 Forward Fuselage |
| F18 Inner Wing |
| F18 Outer Wing |
| T45 Final Assembly |

The defined work path names are associated with the resource type, as shown in step 212. The result is data 212D associating the work path name to the resource type. Exemplary data is shown below in Table VI

TABLE VI

| |
|---|
| F15 = F15 Final Assembly |
| F18 = F18 Final Assembly |
| T45 = T45 Final Assembly |

Work zone paths are then defined, as shown in block 214. Each work zone path is the work path defined by a sequential listing of the work zones 152 that the resource 160 passes through. The result is work path zone data 214D. Exemplary data is shown below in Table VII:

TABLE VII

| # | R/T | Path Name | Zone Path | Zone Path Group |
|---|---|---|---|---|
| 1 | F15 | F15 Final Assembly | F15 Station 001 | Final Assembly |
| 2 | F15 | F15 Final Assembly | F15 Station 002 | Final Assembly |
| 3 | F15 | F15 Final Assembly | F15 Station 003 | Final Assembly |
| 1 | F18 | F18 Final Assembly | F18 Station 001 | Final Assembly |
| 2 | F18 | F18 Final Assembly | F18 Station 002 | Final Assembly |
| 3 | F18 | F18 Final Assembly | F18 Station 003 | Final Assembly |
| 4 | F18 | F18 Final Assembly | F18 Station 004 | Final Assembly |
| 1 | T45 | T45 Final Assembly | T45 Station 001 | Final Assembly |

At the conclusion, the set up process is complete.

Figure 3:
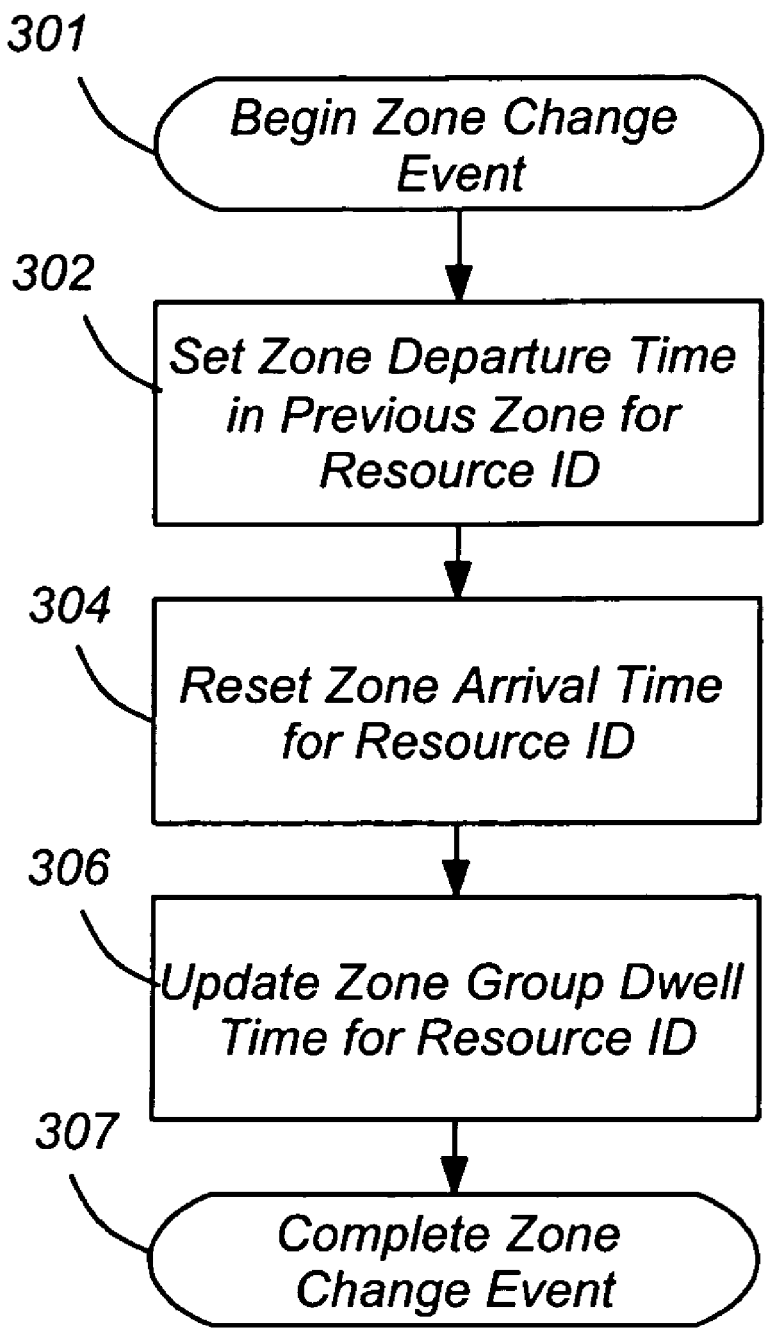
FIG. 3 is a flow chart illustrating one embodiment of how the time that each resource spends in each work zone can be monitored.

FIG. 3 is a flow chart illustrating one embodiment of how the time that each resource 160 or resource type spends in each work zone 152 can be monitored. A work flow describing an expected work path 170 of the resource is defined. As described above, the work flow comprises a sequence (e.g. 152A, 152B, 152C, 152B, 152D, 152E, and 152F) of a plurality of the defined work zones 152. As the resource 160 follows the work path 170, the RFID system 100 monitors the location of the wireless tag 162 attached to the resource 160 and associated with the defined resource type.

When the RFID system 100 monitoring the wireless tag 162 determines that the tag 162 has left the work zone 152 in which it was previously located, a zone change event is identified 301. When this occurs, the RFID system 100 sets a departure time in the previous work zone 152 (the work zone 152 that the tag 162 just exited) for the resource ID associated with the resource 160 to which the tag 162 is attached, as shown in step 302. Because the resource 160 is no longer in that work zone 152, the RFID system 100 also resets the zone arrival time for the same zone 152, as shown in step 304. The RFID system 100 also updates the zone group dwell time (the amount of time that the tagged resource has spent in the group of work zones 152 that define the work zone group) for the resource ID. Once this is completed, processing for the work zone change event is completed, as shown in 307.

For example, referring back to FIG. 1, when the RFID system 100 locates the resource 160 outside of the first work zone 152A, the time at which the resource 160 associated with the resource ID transmitted by the attached tag 162 departed the zone is set (allowing the time the resource 160 dwelled in the work zone 152A to be computed), and the arrival time for that resource 160 (when it entered the first work zone 152A) is reset because it is no longer needed and because it will be used to compute the dwell time in the next work zone 152B in the work zone flow 170. That is, the arrival time is set when the RFID system 100 locates the tag 162 in another defined workspace). Unfortunately, because of the insufficient accuracy of the RFID system 100, the arrival time may be set when the tag 162 is physically located at position "C" and not truly disposed in a work zone 152I. Also, RFID system 100 inaccuracies can cause an zone change event, even when the actual physical location of the tag 162 has not left the zone. For example, the RFID system 100 may locate the tag 162 in an area within area 172, and out of work zone 152A. Such errors can cause the accumulated time figures computed above to be substantially in error.

Figure 4:
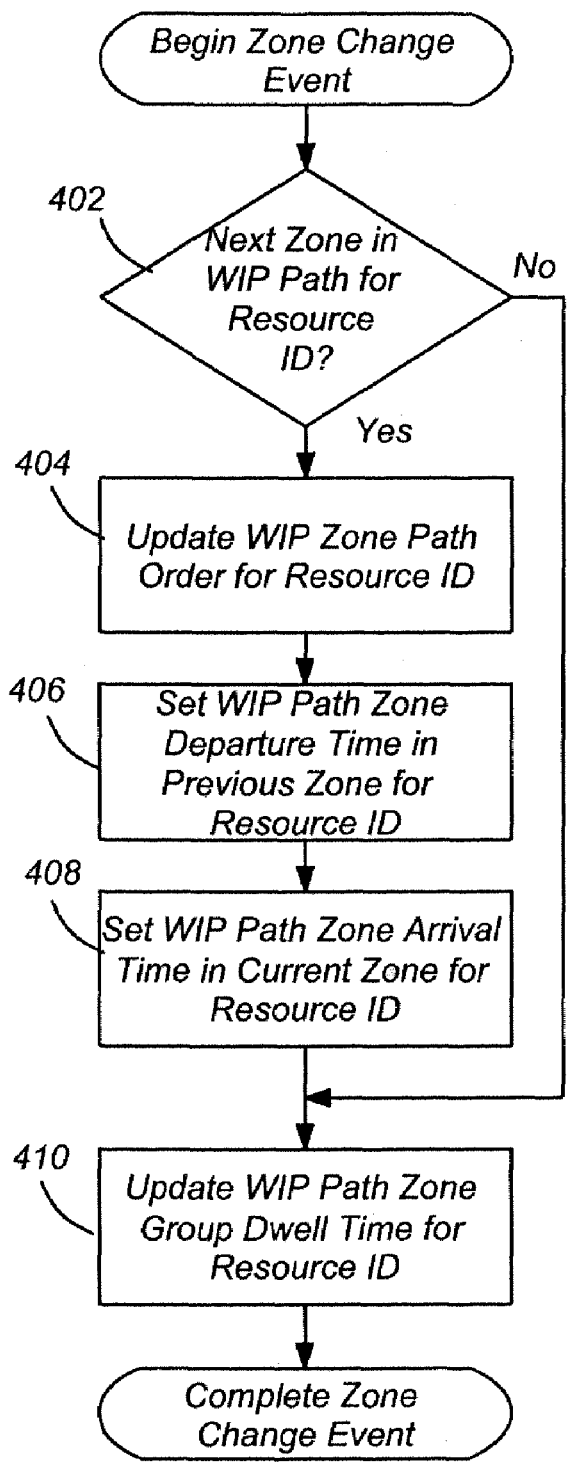
FIG. 4 is a flow chart illustrating another embodiment of how work flow can be monitored and the time each resource spends in each work zone can be monitored.

FIG. 4 is a flow chart illustrating another embodiment of how work flow can be monitored and the time each resource 160 spends in each work zone 152 can be monitored.

A work flow describing an expected work path 170 of the resource 160 is defined. As described above, the work flow comprises a sequence of a plurality of the defined work zones 152. As the resource follows the work path, the RFID system 100 monitors the location of the wireless tag 162 attached to the resource 160 and associated with the defined resource type.

When the monitored location of the wireless tag 162 moves from a first work zone 152 to a second work zone 152, the RFID system 100 determines whether the second work zone 152 sequentially follows the first work zone 152 in the sequence of work zones 152. This is shown in step 402.

If the second work zone 152 sequentially follows the first work zone 152, the location of the tag 162 as monitored by the RFID system 100 is associated with the second zone 152 (the RFID system 100 now considers the tag 162 to be in the second zone 152, and logic passes to step 404-408 where appropriate steps are taken to keep track of the time that the resource spends in each work zone 152, as further detailed below. If not, the location of the tag 162 as monitored by the RFID system 100 remains associated with the first zone 152. Steps 404-408 are bypassed, and logic instead passes to step 410. Where the time during which the monitored tag is associated with the work zone group to which the first work zone 152 belongs.

For example, if the monitored location of the wireless tag 162 moves from first work zone 152A to second work zone 152B, the RFID system 100 recognizes that the new (second) work zone 152B is the work zone 152 that should sequentially follow the first work zone 152A, and hence, considers the tag 162 to be in the second zone 152B. Hence, the RFID system 100 computes an accumulated time during which the monitored location of the wireless tag is associated with the first zone 152A. In one embodiment, this can be accomplished by setting a zone departure time for the first zone 152A to the time at which the monitored location of the wireless tag 162 appeared in the second work zone 152B, and subtracting the zone arrival time for the first zone 152A from the zone departure time for the first zone 152A. This provides the total time that the resource 160 has spent in the first work zone 152A.

However, if the monitored location of the wireless tag 162 were instead to move from first work zone 152A to third work zone 152C or to any work zone other than second work zone 152B, the RFID system 100 considers this zone change event to be erroneous, and does not associate the tag 162 with the third work zone 152. Logic then passes to step 410 to accumulate the work group zone time (since the resource 160 is still within the work group).

The foregoing operations are shown in additional detail in steps 402-410 of FIG. 4. First, step 402 determines if new work zone 152 is the next work zone 152 in sequence of work zones 152 that define the work flow for the resource 603 at issue. If the new work zone 152 is the next work zone 152 identified in the sequential list of work zones 152, step 404 updates the work flow order for the resource ID to indicate that the resource 160 is now located in the new work zone 152. Step 406 sets the departure time for the previous work zone 152 for that resource ID to the current time (so that the dwell time in that work zone 152 can be computed as a difference between the departure time and the entry time), and step 408 sets the arrival time for the new work zone 152 for that resource ID to the current time. Step 410 computes an accumulated dwell time that the tag is associated with the work flow group (e.g. the accumulated time that the RFID system 100 locates the tag 162 in one at least one of the work zones 152 in the group of work zones.

Figure 5:
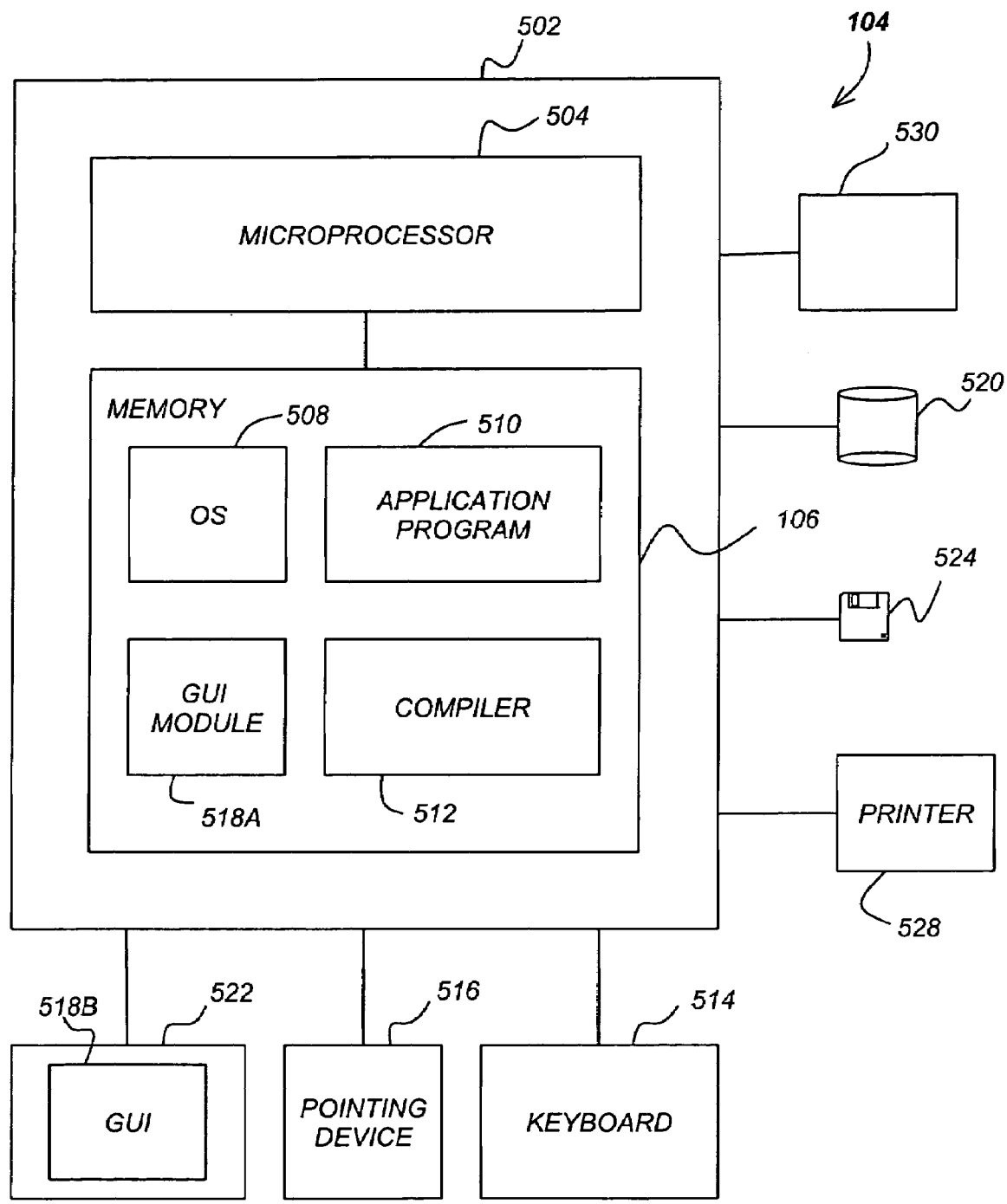
FIG. 5 illustrates an exemplary computer system that could be used to implement the processor.

FIG. 5 illustrates an exemplary computer system 500 that could be used to implement the processor 104. The computer 502 comprises a microprocessor 504 and a memory, such as random access memory (RAM) 506. The computer 502 can be operatively coupled to a display 522, which presents images such as windows to a user on a graphical user interface 518B. The computer 502 may be coupled to other devices, such as a keyboard 514, a mouse device 516, a printer, etc. Of course, those skilled in the art will recognize that any combination of the above components, or any number of different components, peripherals, and other devices, may be used with the computer 502.

Generally, the computer 502 operates under control of an operating system 508 stored in the memory 506, and interfaces with the user to accept inputs and commands and to present results through a graphical user interface (GUI) module 518A. Although the GUI module 518A is depicted as a separate module, the instructions performing the GUI functions can be resident or distributed in the operating system 508, the computer program 510, or implemented with special purpose memory and processors. The computer 502 may also implement a compiler 512 which allows an application program 510 written in a programming language such as COBOL, C++, FORTRAN, or other language to be translated into processor 504 readable code. After completion, the application 510 accesses and manipulates data stored in the memory 506 of the computer 502 using the relationships and logic that were generated using the compiler 512. The computer 502 also optionally comprises an external communication device such as a modem, satellite link, Ethernet card, or other device for communicating with other computers.

In one embodiment, instructions implementing the operating system 508, the computer program 510, and the compiler 512 are tangibly embodied in a computer-readable medium, e.g., data storage device 520, which could include one or more fixed or removable data storage devices, such as a zip drive, floppy disc drive 524, hard drive, CD-ROM drive, tape drive, etc. Further, the operating system 508 and the computer program 510 are comprised of instructions which, when read and executed by the computer 502, causes the computer 502 to perform the steps necessary to implement and/or use the processor 504. Computer program 510 and/or operating instructions may also be tangibly embodied in memory 106 and/or data communications devices 130, thereby making a computer program product or article of manufacture. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present disclosure. For example, those skilled in the art will recognize that any combination of the above components, or any number of different components, peripherals, and other devices, may be used.

Conclusion

This concludes the description of the preferred embodiments of the present disclosure. The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. A method of monitoring work flow of a resource, comprising:
   defining a work flow describing an expected work path of the resource, the work flow comprising a sequence of a plurality of defined work zones;
   monitoring the location of a wireless tag associated with a defined resource type and attached to a resource being a member of the defined resource type;
   when the monitored location of the wireless tag moves from a first work zone to a second work zone, determining if the second work zone sequentially follows the first work zone in the sequence of work zones;
   if the second work zone does not sequentially follow the first work zone in the sequence of work zones, associating the monitored location of the wireless tag with the first zone;
   if the second work zone sequentially follows the first work zone, associating the monitored location of the wireless tag with the second zone;
   setting a zone arrival time for the first zone at a time at which the monitored location of the wireless tag was within the first zone; and
   computing an accumulated time during which the monitored location of the wireless tag is associated with the first zone, comprising the steps of:
      setting a zone departure time for the first zone to the time at which the monitored location of the wireless tag appears in the second work zone; and
      subtracting a zone arrival time for the first zone from the zone departure time for the first zone.

2. The method of claim 1, further comprising the steps of:
defining the plurality of work zones;
defining the resource type, the resource being a member of the resource type;
associating the wireless tag to the resource; and
defining the work flow describing the expected work path of the resource, the work flow comprising a sequence of the work zones.

3. The method of claim 1, further comprising:
setting a zone arrival time for the second zone to the time at which the monitored location of the wireless tag appears in the second work zone.

4. The method of claim 1, further comprising:
defining at least one work group having the plurality of work zones; and
computing an accumulated time during which the monitored location of the wireless tag is associated with the work group.

5. An apparatus for monitoring work flow of a resource, comprising:
a wireless locating system having a plurality of tags;
a receiver for receiving signals transmitted by the plurality of tags;
a locating system for locating the tags based on the received signals, the locating system comprising a processor having a memory storing instructions comprising instructions for:
accepting a defined a work flow describing an expected work path of the resource, the work flow comprising a sequence of a plurality of defined work zones;
monitoring the location a wireless tag associated with a defined resource type and attached to a resource being a member of the defined resource type;
when the monitored location of the wireless tag moves from a first work zone to a second work zone, determining if the second work zone sequentially follows the first work zone in the sequence of work zones;
associating the monitored location of the wireless tag with the first zone if the second work zone does not sequentially follow the first work zone in the sequence of work zones;
associating the monitored location of the wireless tag with the second zone if the second work zone sequentially follows the first work zone;
setting a zone arrival time for the first zone at a time at which the monitored location of the wireless tag was within the first zone;
computing an accumulated time during which the monitored location of the wireless tag is associated with the first zone, comprising instructions for:
setting a zone departure time for the first zone to the time at which the monitored location of the wireless tag appears in the second work zone; and
subtracting a zone arrival time for the first zone from the zone departure time for the first zone.

6. The apparatus of claim 5, wherein the instructions further comprise instructions for:
defining the plurality of work zones;
defining the resource type, the resource being a member of the resource type;
associating the wireless tag to the resource; and
defining the work flow describing the expected work path of the resource, the work path comprising a sequence of the work zones.

7. The apparatus of claim 5, wherein the instructions further comprise instructions for:
setting a zone arrival time for the second zone to the time at which the monitored location of the wireless tag appears in the second work zone.

8. The apparatus of claim 5, wherein the instructions further comprise instructions for:
defining at least one work group having the plurality of work zones; and
computing an accumulated time during which the monitored location of the wireless tag is associated with the work group.

9. An apparatus for monitoring work flow of a resource, comprising:
means for defining a work flow describing an expected work path of the resource, the work flow comprising a sequence of a plurality of defined work zones;
means for monitoring the location a wireless tag associated with a defined resource type and attached to a resource being a member of the defined resource type;
means for determining when the monitored location of the wireless tag moves from a first work zone to a second work zone;
means for determining if the second work zone sequentially follows the first work zone in the sequence of work zones when the monitored location of the wireless tag moves from a first work zone to a second work zone;
means for associating the monitored location of the wireless tag with the first zone if the second work zone does not sequentially follow the first work zone in the sequence of work zones;
means for associating the monitored location of the wireless tag with the second zone if the second work zone sequentially follows the first work zone;
means for setting a zone arrival time for the first zone at a time at which the monitored location of the wireless tag was within the first zone; and
means for computing an accumulated time during which the monitored location of the wireless tag is associated with the first zone, comprising:
means for setting a zone departure time for the first zone to the time at which the monitored location of the wireless tag appears in the second work zone; and
means for subtracting a zone arrival time for the first zone from the zone departure time for the first zone.

10. The apparatus of claim 9, further comprising:
means for defining the plurality of work zones;
means for defining the resource type, the resource being a member of the resource type;
means for associating the wireless tag to the resource; and
means for defining the work flow describing the expected work path of the resource, the work flow comprising a sequence of the work zones.

11. The apparatus of claim 9, further comprising:
means for setting a zone arrival time for the second zone to the time at which the monitored location of the wireless tag appears in the second work zone.

12. The apparatus of claim 9, further comprising:
means for defining at least one work group having the plurality of work zones; and
means for computing an accumulated time during which the monitored location of the wireless tag is associated with the work group.

* * * * *